United States Patent
Allen et al.

(10) Patent No.: US 10,387,668 B2
(45) Date of Patent: *Aug. 20, 2019

(54) DATA PROTECTED PROCESS CORES

(71) Applicant: International Business Machines Corporation, Armonk, NY (US)

(72) Inventors: Corville O. Allen, Morrisville, NC (US); Lee N. Helgeson, Rochester, MN (US); Russel L. Young, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/325,708

(22) Filed: Jul. 8, 2014

(65) Prior Publication Data
US 2016/0011991 A1   Jan. 14, 2016

(51) Int. Cl.
*G06F 21/62* (2013.01)
*G06F 21/75* (2013.01)
*G06F 21/79* (2013.01)
*G06F 9/455* (2018.01)

(52) U.S. Cl.
CPC ...... *G06F 21/6218* (2013.01); *G06F 9/45558* (2013.01); *G06F 21/6245* (2013.01); *G06F 21/75* (2013.01); *G06F 21/79* (2013.01); *G06F 2009/45587* (2013.01); *G06F 2009/45591* (2013.01)

(58) Field of Classification Search
CPC ............. G06F 12/1458; G06F 12/1466; G06F 2212/1052; G06F 21/6218; G06F 9/44; G06F 21/6245; G06F 21/75; G06F 21/79; G06F 9/45558; G06F 2009/45587; G06F 2009/45591

See application file for complete search history.

(56) References Cited

U.S. PATENT DOCUMENTS

| | | | |
|---|---|---|---|
| 8,589,749 B1* | 11/2013 | Yu | G01R 31/318597 714/729 |
| 8,600,935 B1 | 12/2013 | Dantkale et al. | |
| 9,231,923 B1* | 1/2016 | Cignetti | H04L 63/0428 |
| 2007/0006226 A1* | 1/2007 | Hendel | G06F 9/45533 718/1 |

(Continued)

FOREIGN PATENT DOCUMENTS

GB    2494011 A    2/2013

OTHER PUBLICATIONS

U.S. Appl. No. 14/566,967, entitled "Data Protected Process Cores", filed Dec. 11, 2014.

(Continued)

*Primary Examiner* — Linglan E Edwards
*Assistant Examiner* — Forrest L Carey
(74) *Attorney, Agent, or Firm* — Patterson + Sheridan, LLP (57) ABSTRACT

Embodiments provided in this disclosure include a method, computer program product, and system for protecting sensitive data in a processing system comprising a plurality of processor cores. The method includes designating at least one processor core for processing sensitive data, and during a dump event, capturing data from each of the plurality of processor cores except the designated processor core to prevent unauthorized access to sensitive data.

20 Claims, 5 Drawing Sheets

(56) References Cited

U.S. PATENT DOCUMENTS

| | | | | |
|---|---|---|---|---|
| 2007/0255912 | A1* | 11/2007 | Kelly | G06F 21/6245 711/159 |
| 2010/0077472 | A1* | 3/2010 | Kaabouch | G06F 21/74 726/16 |
| 2010/0161926 | A1 | 6/2010 | Li et al. | |
| 2011/0153944 | A1* | 6/2011 | Kursawe | G06F 12/0802 711/122 |
| 2011/0238768 | A1* | 9/2011 | Habets | G06F 11/0748 709/206 |
| 2011/0246767 | A1* | 10/2011 | Chaturvedi | G06F 21/53 713/164 |
| 2013/0031420 | A1* | 1/2013 | Haverkamp | G06F 21/74 714/45 |
| 2013/0210423 | A1* | 8/2013 | Thing | H04W 24/00 455/425 |
| 2013/0262503 | A1 | 10/2013 | Newton et al. | |
| 2013/0262867 | A1 | 10/2013 | Evancich et al. | |
| 2013/0291127 | A1 | 10/2013 | Bergman et al. | |
| 2014/0006798 | A1 | 1/2014 | Prakash et al. | |
| 2014/0025903 | A1 | 1/2014 | Yamashita et al. | |
| 2014/0026194 | A1 | 1/2014 | Smith | |
| 2014/0047174 | A1 | 2/2014 | Sakthikumar et al. | |
| 2014/0181359 | A1* | 6/2014 | Zhang | G06F 11/1484 711/6 |

OTHER PUBLICATIONS

List of IBM Patents or Patent Applications Treated As Related.

Lee et al.; "Efficient Multimedia Data Protection Using a Multi-Core Embedded Processor", Consumer Electronics, ISCE '09 IEEE 13th International Symposium on, May 25-28, 2009, pp. 71-75.

ip.com et al.; "Dedicated Processor Core to Detect and Prevent Security Threats", IPCOM000222433D, Oct. 5, 2012, pp. 1-3.

Platte et al.; "A Combined Hardware and Software Architecture for Secure Computing", ACM Proceedings of The 2nd Conference on Computing Frontiers, May 4-6, 2005, pp. 280-288.

* cited by examiner

DATA PROTECTED PROCESS CORES

BACKGROUND

Embodiments presented in this disclosure generally relate to data security, and more specifically, to protecting sensitive data during data captures associated with diagnosing and debugging operations.

Computer programs, such as operating systems, may experience hardware errors causing the program to terminate abnormally or otherwise fail from time to time (often referred to as a program or computer "crash"). In an effort to prevent similar crashes and thereby improve a program's stability, diagnostic and/or debugging operations are typically performed that capture a snapshot of the current state of the computer at the time of the crash. The snapshot, sometimes referred to as a "core dump," "memory dump," or "system dump," typically includes data from the computer's memory, as well as data from the processor (e.g., data stored in the processor registers or cache, information about the processor registers, flags, etc.) that had been executing the program at the time of the crash.

Diagnostic and debugging operations are generally agnostic to the nature of the data being handled by computer programs. That is, these operations are concerned with capturing the operational state of the computer and any conditions that may have caused the crash (e.g., hardware errors), and so handle all program data in the same manner, whether sensitive or not. Thus, data captures performed by these types of operations may create data security breaches by exposing sensitive data to those not authorized to handle it, which in certain cases may give rise to criminal or civil liability.

SUMMARY

According to one embodiment, a method is provided for protecting sensitive data in a processing system comprising a plurality of processor cores. The method includes, from the plurality of processor cores, designating at least one processor core for processing sensitive data, and during a dump event, capturing data from each of the plurality of processor cores except the designated processor core to prevent unauthorized access to sensitive data.

According to one embodiment, a system is provided that includes a plurality of processor cores, at least one of which is designated for processing sensitive data. The system further includes a service module coupled to the plurality of processor cores and configured to capture data during a dump event, wherein the service module is further configured to capture data from each of the plurality of processor cores except the designated processor core to prevent unauthorized access to sensitive data.

According to one embodiment, a computer readable medium is provided that contains a program which, when executed, performs an operation that includes: designating at least one processor core, from a plurality of processor cores, for processing sensitive data, and during a dump event, capturing data from each of the plurality of processor cores except the designated processor core to prevent unauthorized access to sensitive data.

BRIEF DESCRIPTION OF THE SEVERAL VIEWS OF THE DRAWINGS

So that the manner in which the above recited aspects can be understood in detail, a more particular description of embodiments of the invention, briefly summarized above, may be had by reference to embodiments, some of which are illustrated in the appended drawings. Note, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments provided in this disclosure include a method, computer program product, and system for protecting sensitive data in a processing system comprising a plurality of processor cores and/or memory. The method includes designating at least one processor core for processing sensitive data, and during a dump event, capturing data from each of the plurality of processor cores except the designated processor core to prevent unauthorized access to sensitive data.

By designating components (or portions of components) of the computing system specifically for handling sensitive data, the sensitive data may remain protected during data captures related to dump events. Further, by specifying designated components (or portions thereof), the processing required to identify non-sensitive data to be captured following a dump event may be drastically reduced.

Figure 1A:
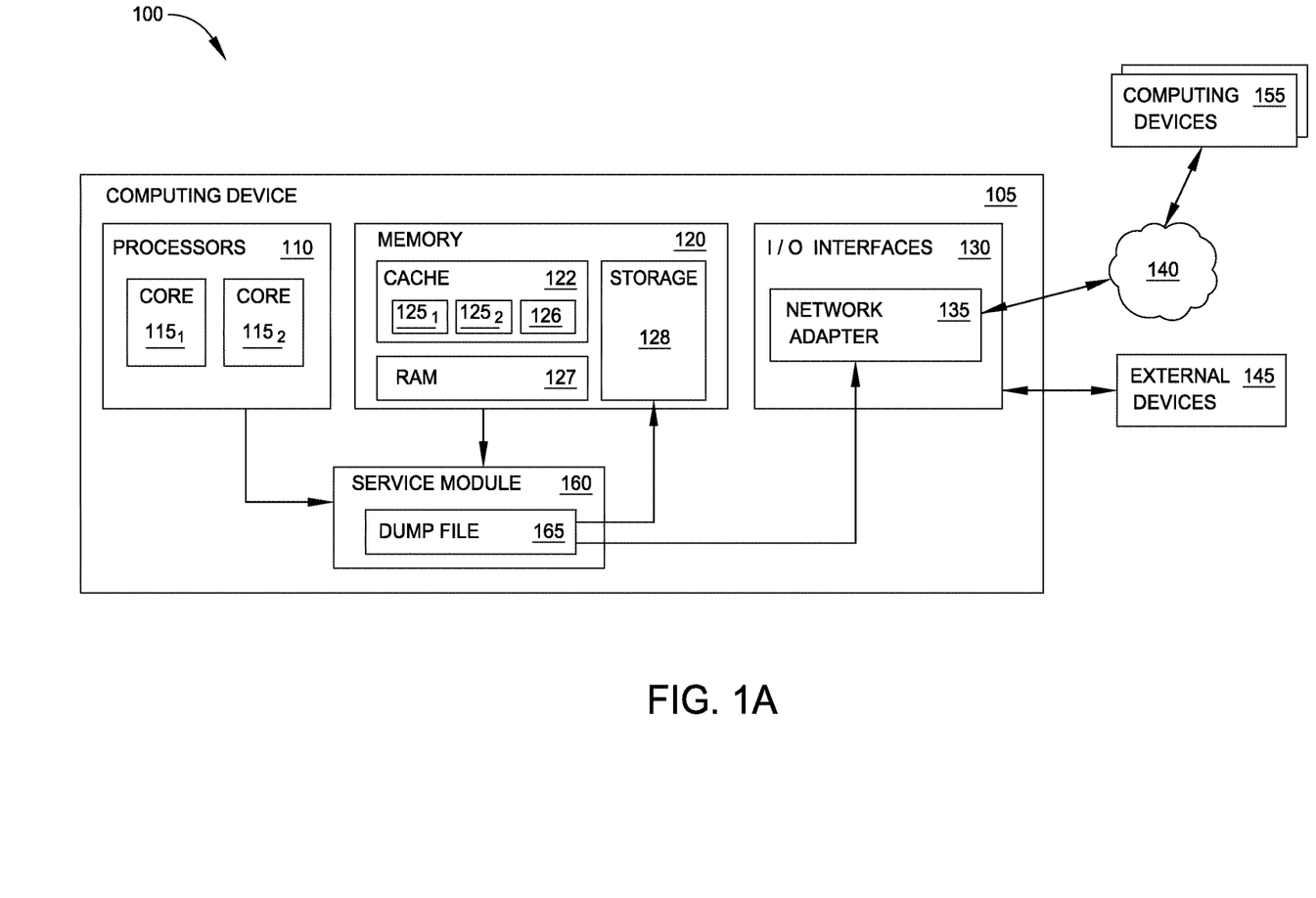
FIG. 1A illustrates networked computing devices, according to one embodiment described herein.

FIG. 1A illustrates networked computing devices, according to one embodiment described herein. At least one of the networked computing devices may be configured to protect sensitive data during processing and transmission of data.

Computing environment 100 includes a computing device 105 coupled to one or more other computing devices 155 through a network 140. Computing devices 105, 155 may generally include any general purpose or special purpose computing system capable of handling sensitive data. Some examples of well-known computing systems that may be suitable for use as computing devices 105, 155 include, but are not limited to, personal computer systems, server computer systems, thin or thick clients, hand-held, mobile, or laptop devices, multiprocessor systems, microprocessor-based systems, set top boxes, programmable consumer electronics, network PCs, minicomputer systems, mainframe computer systems, and so forth. As shown, computing device 105 includes several components, such as one or more processors 110, memory 120, and input/output (I/O) interfaces 130. Each of these components may be interconnected and may communicate using one or more system buses (not shown). Though not shown in detail, computing devices 155 may generally include similar components that are capable of performing similar computing and communications functions. In one embodiment, computing devices 155 may be the same as computing device 105.

Processors 110 may include one or more processing elements capable of performing the functions described herein. As shown, processors 110 include a plurality of processor cores $115_1$, $115_2$. While two cores $115_1$, $115_2$ are shown, in other embodiments the plurality of processor cores may include more than two cores (e.g., three, four, six, eight cores). The plurality of cores 115 may be included as a single processor (i.e., a multi-core processor) or distributed among multiple processors (i.e., one or more cores from each processor).

The memory 120 may include a variety of computer readable media selected for performance or other capabilities: volatile and/or non-volatile media, removable and/or non-removable media, etc. The memory 120 may include a cache 122, a random access memory (RAM) 127, and a storage 128. The cache 122 may be sub-divided into one or more elements, such as a cache $125_1$, $125_2$ corresponding to each processor core $115_1$, $115_2$ (for example, a level 1 cache included with each processor core), and may also include a cache 126 shared between the processor cores. RAM 127 may include one or more discrete memory modules, such as dynamic RAM (DRAM) dual inline memory modules (DIMMs). Of course, various memory chips, bandwidths, and form factors may alternately be selected. Storage 128 may typically provide a non-volatile memory for the computing device 105, and may include one or more different storage elements such as Flash memory, a hard disk drive, a solid state drive, an optical storage device, and/or a magnetic storage device.

The computing device 105 may communicate with other devices using one or more I/O interfaces 130. One or more external devices 145 may be communicate through I/O interfaces 130, such as a display, keyboard, pointing device, etc. The computing device 105 may also communicate with networking devices through I/O interfaces 130, such as a network adapter 135 or modem, in order to establish communication with other computing devices 155 through network 140. Network 140 may include one or more networks of various types, including a local area or local access network (LAN), a general wide area network (WAN), and/or a public network (e.g., the Internet). Of course, other hardware and/or software components may be used in conjunction with computing devices 105. Examples include, but are not limited to microcode, device drivers, redundant processing units, external disk drive arrays, RAID systems, tape drives, and data archival storage systems, etc.

Computing device 105 includes a service module 160 that is generally configured to perform data capture during a dump event. Beyond data capture, service module 160 may perform additional service or administrative functions during the operation of computing device 105, several examples of which will be described below. Though depicted separately from other components of computing device 105, service module 160 may be a distinct component in some embodiments, or may be implemented using components of the computing device 105 in other embodiments. For example, the service module 160 may be a separate hardware or firmware module included in the computing device 105 (e.g., a service processor), or may be implemented using an application included in storage 128 and configured to execute on one of the processor cores 115 and to read and write to a portion of storage 128. In an alternate embodiment, and as will be discussed below, service module 160 may be implemented outside of computing device 105 (for example, using another computing device communicatively coupled to computing device 105).

As defined herein, a dump event may include any type of operation in which raw data is captured and/or stored for analysis. A dump event may include a "core dump," "memory dump," or "system dump," which generally capture a snapshot of memory regions associated with a particular software process when the process terminates abnormally (or "crashes"). For example, a failure of an application or of an operating system may trigger a core dump. However, dump events need not be limited to extraordinary events such as crashes or failures, but may include data captures that occur during regular operations. For example, a dump event may include taking a snapshot of the contents of a processor register, a particular RAM chip or module, a sector or other portion of a hard drive, etc. as part of hardware reliability testing. Of course, other contexts for capturing system data are possible.

In many cases, the data capture associated with a dump event is performed for diagnostic or debugging purposes, and may include relatively large amounts of data. Moreover, a dump event is typically agnostic to the types or classifications of data included in the capture. In other words, a dump event generally captures the raw data in the same way, regardless of whether the data is classified or otherwise treated differently. While capturing large amounts of data may be beneficial for pinpointing conditions and causes of failures within a computing device, the data captures simply cannot account for data requiring a greater level of protection or security. These protections for sensitive data may be required by law, by agreement, or simply as a matter of prudence. For example, the Health Insurance Portability and Accountability Act of 1996 (HIPAA) requires protection for all "individually identifiable health information," or Protected Health Information (PHI). In electronic systems, HIPAA requires several positive controls to prevent unauthorized access to PHI, such as access controls, audit controls, integrity controls, and transmission security. Other examples might include computing devices that handle classified information, business trade secrets, other personally identifiable information (PII), etc.

When a system failure or other dump event trigger occurs, the service module 160 may capture various data and state information for the computing device 105. For example, the service module 160 may capture certain contents of memory 120, which may include content at specific memory addresses associated with the failed process. The captured data may include some or all of certain portions of memory 120. For example, if the failed process had been executing on processor core $115_2$ and using data from storage 128, the service module 160 may capture the data in cache $125_2$ (which corresponds to the core $115_2$), some or all of the data in the shared cache 126, some or all of RAM 127, and/or some of storage 128. The captured data may also include portions of memory 120 not specifically associated with the failed process. The service module 160 may also capture data related to processor state at the time of the failure, such as the contents or state of various registers and flags associated with the process.

The data captured by the service module 160 may be stored to a dump file 165. In some embodiments, the dump file 165 may be stored in a separate memory of the service module 160. In other embodiments, the dump file 165 may be stored to storage 128 of the computing device 105. In yet other embodiments, the dump file 165 may be transmitted to an external device 145 or to the network 140 through I/O interfaces 130.

For a computing device 105 that includes sensitive data such as PHI, whether the sensitive data is in motion (e.g., being processed) or at rest (e.g., being stored), it is feasible that the sensitive data may be included in whole or in part during data captures performed by service module 160. While including sensitive data in a data capture (e.g., in a dump file 165) might not violate HIPAA or other regulations or documents per se, the captured data is much more vulnerable to being accessed by unauthorized individuals, as the dump event may effectively circumvent security controls. For example, an information technology (IT) professional tasked simply to diagnose or remedy problems with the computing device 105 might not have authorization to access sensitive data residing on the computing device. Ordinarily, other controls might prevent the IT professional from deliberately accessing sensitive data on the computing device (say, the data is compartmented in files accessible only by authorized and authenticated users). However, the dump event may capture sensitive data, which would be presented to the IT professional during service of the computing device 105. Regardless of any use (or non-use) subsequent to the unauthorized access of the sensitive data, the mere fact of unauthorized access may be a security violation, which could have administrative, civil, or criminal consequences.

Figure 1B:
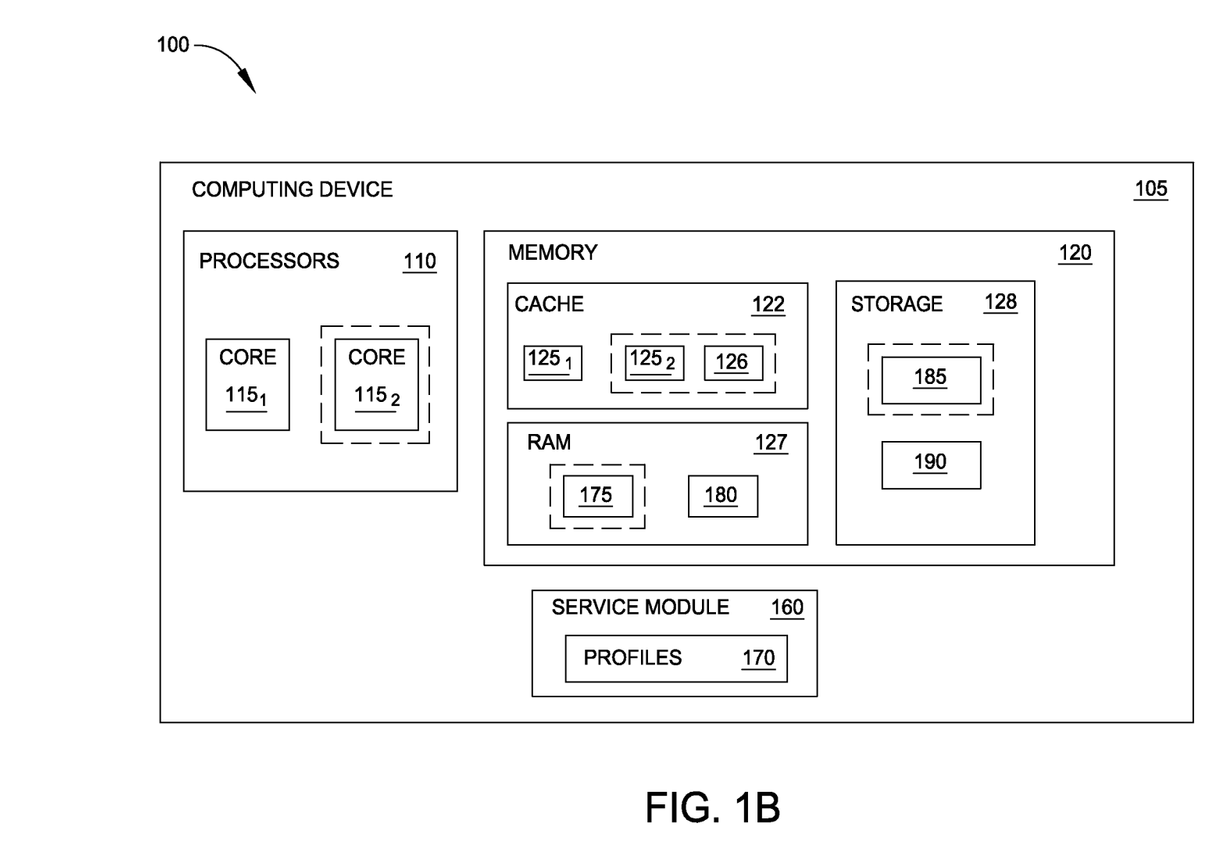
FIG. 1B illustrates a computing device having components designated for handling sensitive data, according to one embodiment described herein.

FIG. 1B illustrates a computing device having components designated for handling sensitive data, according to one embodiment described herein. Computing device 105 may be networked to other computing devices, as shown in FIG. 1A, or may operate as a standalone system.

In order to protect sensitive data during a dump event, portions of the computing device 105 may be appropriately designated for handling or processing sensitive data, and those portions selectively excluded during the data capture occurring with a dump event. Specific components (or portions of the components) of computing device 105 may be designated (here, generally indicated by a dashed line surrounding the component).

As shown in FIG. 1B, processor core 115$_2$ is designated for handling sensitive data, while core 115$_1$ is not so designated. The portion of cache 122 corresponding to the processor core 115$_2$ (i.e., cache 125$_2$), and at least a portion of the shared cache 126 are also designated for handling sensitive data. RAM 127 may be divided into a designated portion 175 and undesignated portion 180, as well as storage 128 (designated portion 185; undesignated portion 190). The designation information specifying which components or portions of computing device 105 are designated may be contained in one or more profiles 170, which may be stored and updated by the service module 160. Profiles 170 may correspond to each individual component (e.g., separate profiles for core 115$_1$ and 115$_2$), or to groupings or categories of components (e.g., one profile for cores 115 and another for storage 128), or may be a single profile reflecting all components of the computing device 105. The profiles 170 may generally include flags or other indicators corresponding to individual components, and/or may include memory address ranges.

In any event, during a data capture associated with a dump event, the service module 160 may access profiles 170 to determine the designations of various components (i.e., from which components data may or may not be captured). As an example, say a particular dump event ordinarily requires capture of the data from all processors and memory from a computing device. Based on profiles 170, service module 160 may capture data from all undesignated portions of computing device 105 (i.e., core 115$_1$, cache 125$_1$, RAM undesignated portion 180, and storage undesignated portion 190), as these portions will not handle sensitive data. Of course, other dump events may require data capture from less than the entire computing device 105 (say, those portions that were involved in executing the crashed software).

To recap, only designated components may perform sensitive data storage and processing, while non-designated components may not. In one embodiment, only components that are not designated for sensitive data may perform data storage and processing for non-sensitive data, so that the designated portions and non-designated portions operate entirely in isolation from each other. This may reduce or eliminate the chance of unauthorized access to sensitive data through dump event data captures. However, understanding that computing system 105 has other performance expectations using finite amounts of resources, one embodiment may allow the apportioning of computing system 105 to be dynamically updated (that is, designated and un-designated) to free resources for other processing and storage tasks. An alternate embodiment may permit designated components to also process and store non-sensitive data, with additional logic to ensure that sensitive and non-sensitive data are not commingled during a data capture associated with a dump event.

Profiles 170 may also be used when assigning computing resources to applications starting up on the computing device 105. Certain applications may require access to sensitive data, which may be indicated during startup by including additional data in a header or other application file. Alternately, profiles 170 may also include an access profile that may indicate the requirement for sensitive data for certain registered applications. By detecting the additional data, or by checking the access profile for the particular application, the appropriate designated or undesignated computing resources may be allocated for running the application.

As described above, capturing a larger amount of data may generally be beneficial to diagnostics or debugging. Therefore, service module 160 may be configured to capture all non-sensitive data from computing device 105. In certain embodiments, the profiles 170 may include location information that indicates where sensitive data is currently located within computing device 105, where components (or portions) of computing device 105 are not specifically designated for handling sensitive data. The location information may be provided at varying levels of resolution; for example, setting a flag may indicate whether a corresponding memory block, word, byte, nibble, bit, etc. includes sensitive data that should not be captured during a dump event. Of course, the level of resolution may differ for different components (e.g., a flag per bit for processor registers and a flag per word for memory), and/or may be selected to provide improvements in performance (e.g., using one flag per byte instead of one flag per bit). While these embodiments would be effective to protect sensitive data during dump events, it might require additional processing for the service module 160 to regularly update the location information, and to screen all of the location information before capturing the non-sensitive data.

Another embodiment may provide a hybrid approach that results in better overall performance. Here, profiles 170 may include designation information indicating which components of computing device 105 are designated for handling sensitive data, as well as location information indicating where sensitive data is located within the designated components. Using profiles 170, service module 160 may capture data from undesignated components without performing any screening, and may screen only those designated components to capture additional non-sensitive data. In this way, a maximum amount of non-sensitive data may be compiled for the dump event, while decreasing the amount of processing required for screening location information.

In another embodiment, all sensitive data may be included in a dump event data capture when the access would be otherwise be authorized. For example, profiles 170 may further indicate which registered users of the computing device 105 are authorized to access sensitive information. Additionally or alternatively, authentication procedures may be used before permitting access to the sensitive information. Some examples include entering a password or keycode by users of the computing device 105 through a graphical user interface (GUI), providing biometric information, providing a smart card, etc. Once authorized or authenticated, the service module 160 may capture data from designated portions of the computing 105, whether sensitive or non-sensitive, during a dump event. This may provide more complete information for diagnostics or debugging, while requiring less processing than if screening for sensitive data had been performed using location information.

Figure 2:
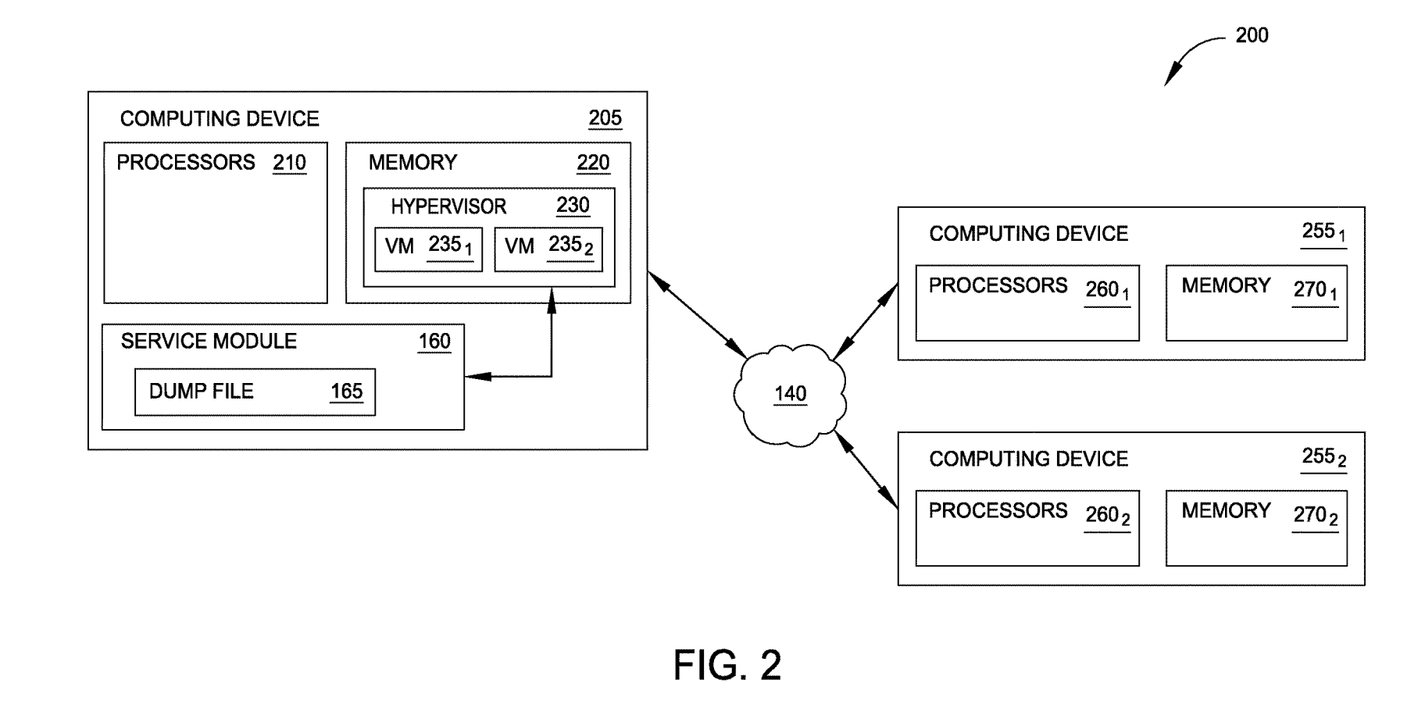
FIG. 2 illustrates networked computing devices in a virtualized environment, according to one embodiment described herein.

FIG. 2 illustrates networked computing devices in a virtualized environment, according to one embodiment described herein. Generally, the techniques described above for protecting sensitive data may also be applied to a virtualized environment, such as through a cloud computing infrastructure.

Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may run applications that handle sensitive data, using computing resources available in the cloud. For example, an application that handles PHI could execute on a virtual machine controlled by a computing system in the cloud. In such a case, if the application failed, the controlling computing system could capture data from the various computing resources, while still protecting sensitive data. Doing so allows an authorized user to access this information from any computing system attached to a network connected to the cloud (e.g., the Internet).

Computing environment 200 includes computing devices 205, $255_1$, $255_2$, which are communicatively coupled through a network 140. The computing devices may generally operate similarly to computing devices 105 and 155 described above. Each computing device 205, $255_1$, $255_2$, includes processors and memory, which may be the same or operate similarly to those elements described above with respect to FIGS. 1A and 1B. As shown, memory 220 of computing device 205 includes a hypervisor 230 that generally manages the creation and operation of virtual machines (VMs) on the computing device 205, such as VMs $235_1$, $235_2$. Hypervisor 230 may assign virtualized hardware resources to VMs $235_1$, $235_2$ that are physically accessible through the network 140 and provided by the various computing devices 205, $255_1$, $255_2$. In other embodiments, hypervisor 230 may be a separate firmware or hardware module within a computing device, or may be an entirely separate device. Of course, computing devices $255_1$, $255_2$ may also include separate hypervisors and VMs and use the virtualized hardware resources.

Figure 3:
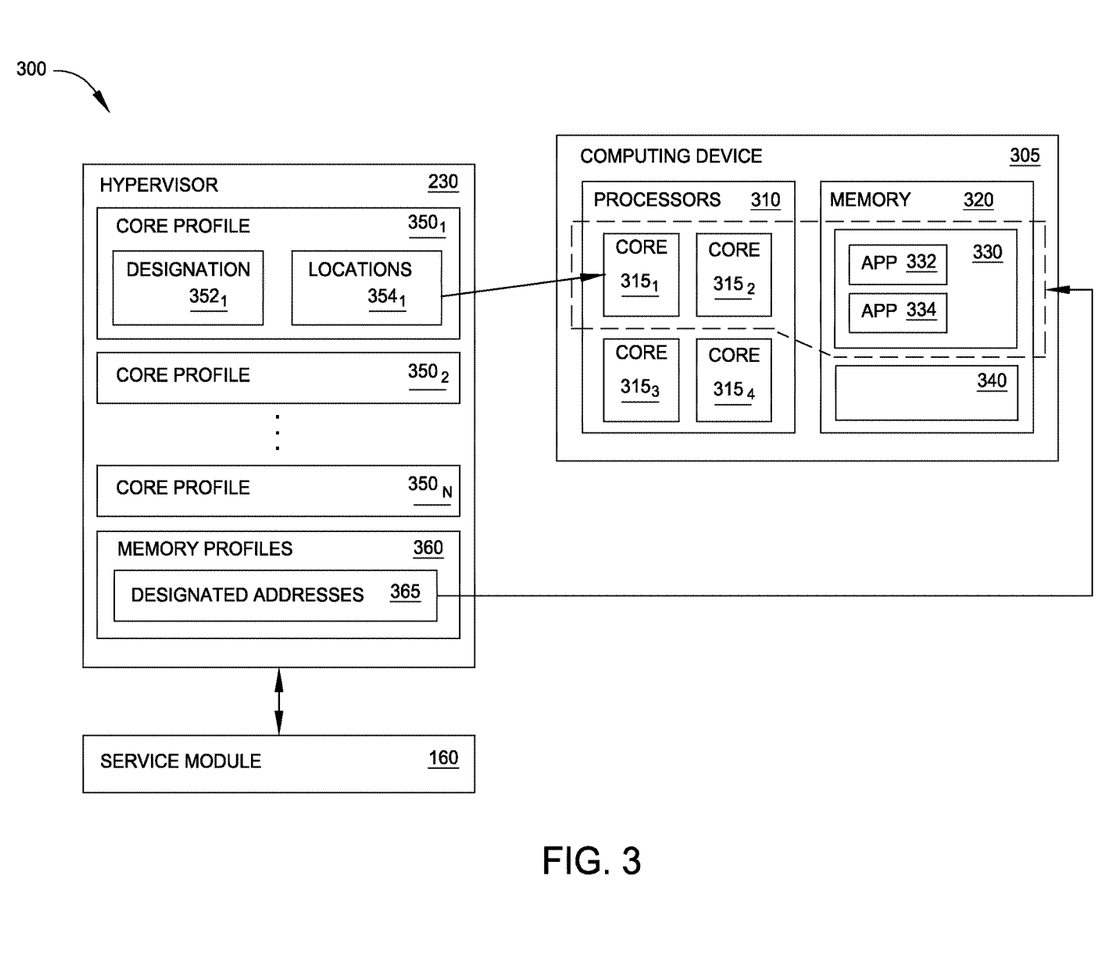
FIG. 3 illustrates a computing device having components designated for handling sensitive data in a virtualized environment, according to one embodiment described herein.

FIG. 3 illustrates a computing device having components designated for handling sensitive data in a virtualized environment, according to one embodiment described herein.

As shown, a hypervisor 230 operating on a particular computing device may access and assign virtualized hardware resources, such as those provided by computing device 305. In one embodiment, the hypervisor 230 may be operating on the computing device 305. The service module 160 may operate on the same computing device as hypervisor 230, or may operate on a separate computing device.

If a VM is assigned hardware resources from various computing devices, a dump event might require capturing data across different devices. To efficiently perform data captures across multiple devices, the service module 160 may generally interface with hypervisor 230. Alternately, service module 160 may be included as a part of hypervisor 230. Hypervisor 230 includes one or more profiles, for example, core profiles $350_1$-$350_n$ corresponding to n virtualized cores in the environment, and a memory profile 360. In various embodiments, the profiles may include designation information, i.e., whether the particular component(s) are permitted to handle sensitive data. Profiles may additionally or alternately include location information that indicates where sensitive data is currently located within the components or within the computing devices, consistent with the discussion provided above.

In one example, say the operating system of a particular VM fails, causing a dump event to occur. The service module 160 may access the profiles 350, 360 in hypervisor 230 to determine the non-sensitive data that may be captured. The service module 160 may access designation information 352 to determine whether the corresponding component is designated for sensitive data and/or location information 354 to determine where sensitive data is currently located in the component. Memory profile 360 may include designated addresses 365 indicating the designated portion 330 of memory 320, or alternately, where sensitive data is currently located in memory 320. Based on the accessed information, the service module 160 may capture data from undesignated components and/or may screen components for non-sensitive data. As shown, cores $315_1$ and $315_2$ are designated for handling sensitive data, as well as a designated portion 330 of memory 320; these designated components/portions are enclosed by a dashed line. Applications 332, 334 that require access to sensitive data may generally be run in the designated memory portion 330, using one or more of the designated cores $315_1$, $315_2$.

Figure 4:
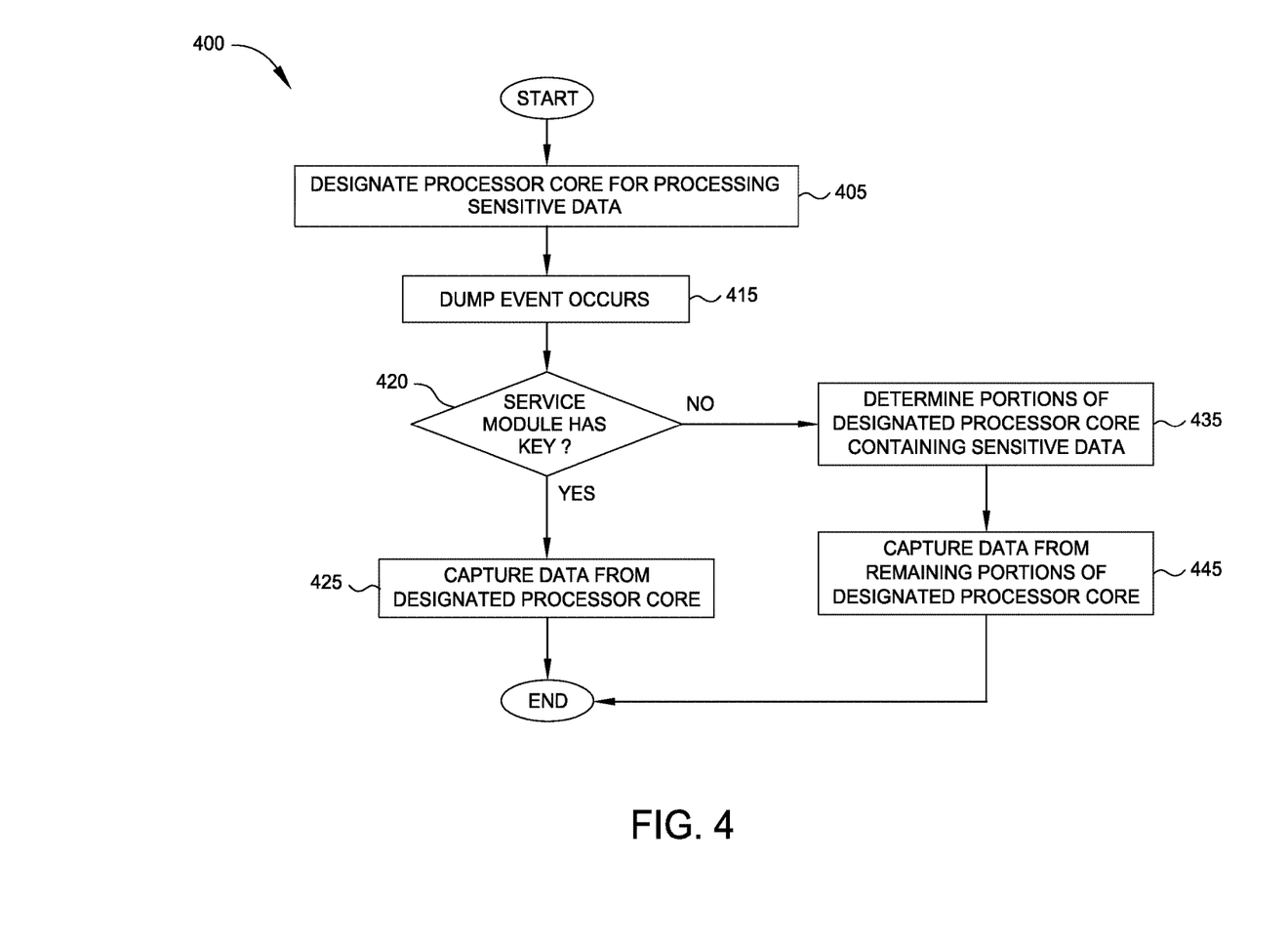
FIG. 4 illustrates a method for protecting sensitive data in a processing system, according to one embodiment described herein.

FIG. 4 illustrates a method for protecting sensitive data in a processing system, according to one embodiment described herein. Method 400 may generally be used with the individual and networked computing devices described in various embodiments above.

Method 400 begins at block 405, where a processor core of a computing device is designated for processing sensitive data. Additionally, various portions of memory may also be designated for processing sensitive data. The memory may be on the same computing device as the designated processor core, or may be on one or more separate computing devices, as may be the case with a virtualized environment.

At block 415, a dump event occurs. Dump events are defined more fully above, but generally may occur upon the failure of a software program, or may occur as a routine part of the program's operation. After a dump event occurs, a data capture may be performed by a service module using at least the non-designated portions of the computing device(s). Of course, the data capture need not apply to all non-designated portions of the computing device(s), but in some cases may be limited to those parts of the non-designated portions that were included in running the software program.

At block 420, the method determines whether the service module includes a key or other authorization or authentication information, in order to establish authorization for a user to access sensitive information within the designated portions (including the designated processor core). If the service module includes the authorization or authentication information ("YES"), the method proceeds to block 425, where all data may be captured from the designated processor core, whether sensitive or non-sensitive.

However, if the service module does not include the authorization or authentication information ("NO"), the method proceeds to block 435, where the service module determines which portions of the designated processor core contain sensitive data. Concurrent with this block, the service module may also determine which sub-portions of designated memory portions contain sensitive data.

In block 445, the service module captures the data from remaining portions of the designated processor core. In other words, the service module captures non-sensitive data included in the designated portions of the processor core. The service module may also capture non-sensitive data from sub-portions of the designated memory portions.

After the appropriate data is captured from the designated processor core in blocks 425 or 445, the method 400 ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system to prevent commingling of sensitive and non-sensitive data during a dump event responsive to an operating system failure in a processing environment virtualized over a plurality of processor cores of a plurality of networked systems, the system comprising:
a plurality of processor cores over which resources are virtualized, the plurality of processor cores including a first processor core designated for processing sensitive data and a second processor core not designated for processing sensitive data, wherein the virtualized resources are assigned to a plurality of virtual machines by a hypervisor configured to execute the plurality of virtual machines;
a memory shared by the plurality of processor cores; and
a service module operatively connected to the plurality of processing cores and the shared memory via one or more system buses, wherein the service module is configured to, responsive to a failure of an operating system executing in a first of the plurality of virtual machines, the operating system having a plurality of executing applications including a first application, perform a dump event, comprising, upon determining that dumping of the sensitive data is not authorized, capturing non-sensitive data, accessible by the operating system, from both a second memory dedicated to the second processor core and the shared memory, while preventing capture of data, accessible by the operating system, from one or more portions designated as sensitive in both shared memory and a first memory dedicated to the first processor core, in order to prevent commingling of the sensitive and non-sensitive data during the dump event.

2. The system of claim 1, wherein the sensitive data is protected health information (PHI).

3. The system of claim 1, wherein the service module is further configured to:
receive an indication from the first application on whether the first application requires processing sensitive data; and
based on the indication, select one or more processor cores of the plurality of processor cores to execute the first application.

4. The system of claim 1, wherein the service module is further configured to capture data from the one or more portions of the first memory that are designated as sensitive and only when the service module includes a key permitting dumping of the sensitive data.

5. The system of claim 1, wherein the service module is further configured to access a core profile corresponding to the first processor core that indicates which portions of the first processor core is designated for sensitive data.

6. The system of claim 1, wherein the service module is further configured to access a profile corresponding to the first memory that indicates which portions of the first memory contain sensitive data.

7. The system of claim 1, wherein the hypervisor executes on the first system, wherein the dump event is performed by a service module of the first system, wherein the service module is configured to, in performing the dump event:
upon determining that dumping of the sensitive data is authorized, capture both sensitive and non-sensitive data from each of the first memory, the second memory, and the shared memory.

8. The system of claim 7, wherein the service module includes hardware separate from the plurality of processor cores, wherein the dump event comprises a core dump event, wherein the failure of the operating system is caused by, in respective instances, a hardware error, an operating system error, and an application error, wherein the service module is configured to:
perform a predefined operation for the first virtual machine in order to capture a snapshot of a then-current state of the first system at a time of the failure, the predefined operation including the dump event, wherein the predefined operation is, in respective instances, a diagnostic operation and a debugging operation;
wherein the dump event includes taking a snapshot of each of a register file, a cache, one or more memory modules, and a storage device, the one or more memory modules including the first memory, the second memory, and the shared memory.

9. The system of claim 8, wherein performing the dump event further comprises:
upon determining that dumping of the sensitive data is not authorized, capturing non-sensitive data, accessible by the operating system, from each of the register file, the cache, and the storage device, while preventing capture of data, accessible by the operating system, from at least one portion designated as sensitive in each of the register file, the cache, and the storage device, in order to prevent commingling of the sensitive and non-sensitive data during the dump event;

upon determining that dumping of the sensitive data is authorized, capture both sensitive and non-sensitive data, accessible by the operating system, from each of the register file, the cache, and the storage device; and determining, based on both of a core profile and a memory profile of the processing environment, whether dumping of the sensitive data is authorized.

10. The system of claim 9, wherein the first processor core designated for processing sensitive data is permitted to process both sensitive data and non-sensitive data;

wherein the second processor core not designated for processing sensitive data is permitted to process non-sensitive data and is not permitted to process sensitive data;

wherein each of the core profile and the memory profile specify locations of the one or more portions designated as sensitive in each of the first memory, the second memory, and the shared memory.

11. The system of claim 10, wherein that dumping of the sensitive data is authorized is determined based further on the service module having a predefined key required to authorize dumping of the sensitive data.

12. The system of claim 11, wherein the service module is coupled to the plurality of processor cores, wherein the plurality of processor cores includes a third processor core, wherein the sensitive data is protected health information (PHI), wherein the service module is further configured to:

prior to executing the first application, determine, based on an access profile for the first application, whether the first application requires processing sensitive data; and based on the determination of whether the first application requires processing sensitive data, select one or more of the plurality of processor cores to execute the first application, the one or more of the plurality of processor cores including the first and second processor cores.

13. The system of claim 1, wherein the service module is configured to:

perform a predefined operation for the first virtual machine in order to capture a snapshot of a then-current state of the first system at a time of the failure, the predefined operation including the dump event, wherein the predefined operation is selected from a diagnostic operation and a debugging operation.

14. A computer-readable device containing a program which, when executed, performs an operation to prevent commingling of sensitive and non-sensitive data during a dump event responsive to an operating system failure in a processing environment virtualized over a plurality of processor cores of a plurality of networked processing systems, the operation comprising:

providing, at least in part, resources virtualized over a plurality of processor cores, including a first processor core designated for processing sensitive data and a second processor core not designated for processing sensitive data, wherein the virtualized resources are assigned to a plurality of virtual machines by a hypervisor configured to execute the plurality of virtual machines;

providing a memory shared by the plurality of processor cores; and responsive to a failure of an operating system executing in a first of the plurality of virtual machines, the operating system having a plurality of executing applications including a first application, performing a dump event, comprising, upon determining that dumping of the sensitive data is not authorized, capturing non-sensitive data, accessible by the operating system, from both a second memory dedicated to the second processor core and the shared memory, while preventing capture of data, accessible by the operating system, from one or more portions designated as sensitive in both a first memory dedicated to the first processor core and the shared memory, in order to prevent commingling of the sensitive and non-sensitive data during the dump event.

15. The computer-readable device of claim 14, wherein the sensitive data is protected health information (PHI).

16. The computer-readable device of claim 14, wherein the operation further comprises:

receiving an indication from the first application on whether the first application requires processing sensitive data; and based on the indication, selecting one or more processor cores of the plurality of processor cores to execute the first application.

17. The computer-readable device of claim 14, wherein a service module performs capturing data during the dump event, wherein data is captured from the one or more portions of the first memory that are designated as sensitive and only when the service module includes a key permitting dumping of the sensitive data.

18. The computer-readable device of claim 14, wherein the operation further comprises:

performing a predefined operation for the first virtual machine in order to capture a snapshot of a then-current state of the first processing system at a time of the failure, the predefined operation including the dump event, wherein the predefined operation is selected from a diagnostic operation and a debugging operation.

19. A system to prevent commingling of sensitive and non-sensitive data during a dump event responsive to an operating system failure in a processing environment virtualized over a plurality of processor cores of a plurality of networked systems, the system comprising:

a plurality of processor cores over which resources are virtualized, the plurality of processor cores initially designated for processing sensitive data, the plurality of processor cores including a first processor core and a second processor core, wherein the virtualized resources are assigned to a plurality of virtual machines by a hypervisor configured to execute the plurality of virtual machines;

a memory shared by the plurality of processor cores;

a service module operatively connected to the plurality of processing cores and the shared memory via one or more system buses, wherein the service module is configured to:

subsequent to sensitive data being processed by the first and second processor cores, designating the second processor core as no longer being authorized to process any sensitive data, whereafter the second processor core no longer processes any sensitive data; and responsive to a failure of an operating system executing in a first of the plurality of virtual machines, the operating system having a plurality of executing applications including a first application, perform a dump event, comprising:

upon determining that dumping of the sensitive data is not authorized, capturing non-sensitive data from both a second memory dedicated to the second processor core and the shared memory, while preventing capture of data from one or more portions designated as sensitive in both shared memory and a first memory dedicated to the first processor core, in order to prevent commingling of the sensitive and non-sensitive data during the dump event when dumping of the sensitive data is not authorized.

20. The system of claim 19, wherein the second processor core is designated, via updating a core profile for the second processor core, as no longer being authorized to process sensitive data.

* * * * *